(12) United States Patent
Murai et al.

(10) Patent No.: US 9,650,529 B2
(45) Date of Patent: May 16, 2017

(54) INK JET FOR PRINTING, INK JET INK SET, AND PRINTING METHOD

(71) Applicant: Seiko Epson Corporation, Tokyo (JP)

(72) Inventors: Masayuki Murai, Shiojiri (JP); Yasuhiro Oki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 501 days.

(21) Appl. No.: 14/314,755

(22) Filed: Jun. 25, 2014

(65) Prior Publication Data

US 2014/0375733 A1 Dec. 25, 2014

(30) Foreign Application Priority Data

Jun. 25, 2013 (JP) ................................ 2013-132382
Jun. 25, 2013 (JP) ................................ 2013-132385

(51) Int. Cl.
| C09D 11/328 | (2014.01) |
| C09D 11/40 | (2014.01) |
| B41J 2/01 | (2006.01) |
| B41J 2/21 | (2006.01) |
| B41J 2/00 | (2006.01) |
| C09D 11/108 | (2014.01) |

(52) U.S. Cl.
CPC ............ *C09D 11/328* (2013.01); *B41J 2/00* (2013.01); *C09D 11/108* (2013.01); *C09D 11/40* (2013.01)

(58) Field of Classification Search
CPC  C09D 11/328; C09D 11/40; B41J 2/01; B41J 2/21
USPC ................... 106/31.27, 31.5, 31.52; 347/100
See application file for complete search history.

(56) References Cited

U.S. PATENT DOCUMENTS

| 6,447,592 | B1* | 9/2002 | Taniguchi | ............... | D06P 1/39 |
| | | | | | 106/31.43 |
| 6,508,549 | B1 | 1/2003 | Romano, Jr. et al. | | |
| 6,513,923 | B1 | 2/2003 | Evans et al. | | |
| 2005/0036018 | A1* | 2/2005 | Yanagihara | ............... | D06P 5/30 |
| | | | | | 347/100 |
| 2005/0057607 | A1* | 3/2005 | Tomioka | ................ | C09D 11/40 |
| | | | | | 347/43 |
| 2007/0058015 | A1* | 3/2007 | Wheeler | ................ | C09D 11/40 |
| | | | | | 106/31.27 |
| 2007/0058016 | A1 | 3/2007 | Valentini et al. | | |
| 2010/0225707 | A1* | 9/2010 | Kudo | .................. | C09D 11/328 |
| | | | | | 347/100 |
| 2010/0283814 | A1* | 11/2010 | Valentini | .............. | C09D 11/328 |
| | | | | | 347/100 |
| 2011/0037793 | A1* | 2/2011 | Valentini | .............. | C09D 11/328 |
| | | | | | 347/1 |

FOREIGN PATENT DOCUMENTS

| JP | 06-057651 A | 3/1994 |
| JP | 2003-034765 A | 2/2003 |
| JP | 2004-182862 A | 7/2004 |
| JP | 2004-217818 A | 8/2004 |
| JP | 2007-076320 A | 3/2007 |
| JP | 2007-238741 A | 9/2007 |
| JP | 2015/117297 | * 6/2015 |
| JP | 2016/135822 | * 7/2016 |

OTHER PUBLICATIONS

Chemical formula of Acid Orange 33; http://www.chemicalbook.com/ChemicalProductProperty_EN_CB9875571.htm; no date available; 1 page.*

Chemical formula of Acid Orange 56; http://chemicalbook.com/ProductChemicalPropertiesCB5875568_EN.htm; no date available; 1 page.*

* cited by examiner

*Primary Examiner* — Helene Klemanski

(74) *Attorney, Agent, or Firm* — Nutter McClennen & Fish LLP; John J. Penny, Jr.

(57) ABSTRACT

Provided is an ink jet ink for printing including: water; a first dye; and a second dye, in which the first dye is C.I. Acid Orange 33, and the second dye is one or two kinds selected from C.I. Acid Orange 56 and C.I. Acid Orange 94.

13 Claims, No Drawings

INK JET FOR PRINTING, INK JET INK SET, AND PRINTING METHOD

BACKGROUND

1. Technical Field

The present invention relates to an ink jet ink for printing, an ink jet ink set, and a printing method.

2. Related Art

Ink jet recording is a method of allowing droplets of an ink to fly and adhere to a recording medium such as paper or transparent film. It is possible to record an image with high resolution and high quality at high speed using a comparatively inexpensive apparatus through this method. In such ink jet recording, a method of using the ink jet ink set has been known as means of obtaining an image excellent in a color developing property and color reproducibility.

When applying the ink jet system for printing on fabric, it is necessary to make the dye concentration high to ensure the color developing property on the fabric. From this perspective, an ink jet ink for printing which contains C.I. Acid Orange 94 has been developed by means of widening the color reproduction range with regard to a red hue (for example, JP-A-2004-182862).

For example, JP-A-2007-238741 discloses an ink jet ink set for printing configured to contain at least a yellow ink, a magenta ink, a cyan ink, and a black ink that respectively contain acid dyes, in which the yellow ink contains C.I. Acid Yellow 79 as an acid dye, the magenta ink contains C.I. Acid Red 249 as an acid dye, the cyan ink contains C.I. Direct Blue 87 as an acid dye, and the black ink contains C.I. Acid Black 52:1 as an acid dye. The aim of the invention of JP-A-2007-238741 is to have a wide color gamut while printing polyamide fibers by selecting an ink colorant and to provide an ink jet ink set for printing which is excellent in fastness of a formed image and excellent in storage stability of the ink.

However, there is a case where color rendering occurs while the color reproduction range widens in the ink jet ink for printing according to JP-A-2004-182862.

The color rendering property is referred to herein that the hue of an object varies depending on the difference of a light source while observing the object. For example, since spectral distribution of identical white light is different between solar light (natural light) and fluorescent light, spectral distribution of reflected light is also different. As a result, there is a case where the color of the object is observed to be different depending on the light environment.

The orange dye that can be used in the ink jet ink set according to JP-A-2007-238741 has a deteriorated color developing property and the color developing property of a recorded matter which can be obtained is also not sufficient. In contrast, in an ink containing an orange dye which is excellent in the color developing property, gas is easily generated and discharge failure caused by the generated gas easily occurs. Accordingly, there is a trade-off relationship between the task of obtaining a recorded matter excellent in the color developing property and the task of suppressing the generation of gas to improve the discharge stability.

SUMMARY

An advantage of some aspects of the invention is to provide an ink jet ink for printing, an ink jet ink set, and a printing method in which a color rendering property can be suppressed, a recorded matter excellent in color developing property can be obtained, and generation of gas can be suppressed to improve discharge stability.

The invention can be realized in the following forms or application examples.

Application Example 1

According to this application example, there is provided an ink jet ink for printing including: water; a first dye; and a second dye, in which the first dye is C.I. Acid Orange 33, and the second dye is one or two kinds selected from C.I. Acid Orange 56 and C.I. Acid Orange 94.

Application Example 2

In the ink jet ink for printing according to the application example, the ratio of the content of the first dye to the content of the second dye may be in a range of (the former):(the latter)=11:1 to 1:1 by mass.

Application Example 3

In the ink jet ink for printing according to the application example, the ratio of the content of the first dye to the content of the second dye may be in a range of (the former):(the latter)=6.5:1 to 1.2:1 by mass.

Application Example 4

In the ink jet ink for printing according to the application example, the total content of the first dye and the second dye may be 5.0 mass % or more.

Application Example 5

According to this application example, there is provided a printing method, including: applying the ink jet ink for printing according to the above-described application example to fabric for printing; and heating the fabric to fix a dye.

Furthermore, the present inventors have found that it is possible to solve the above-described problems using an ink jet ink set including an ink having a predetermined dye.

That is, the invention relating to the ink set is as follows.

Application Example 6

According to this application example, there is provided an ink jet ink set including at least: a first ink; a second ink; a third ink; and a fourth ink. The first ink contains water and a first dye, and a hue angle H calculated from spectral transmittance of a diluted solution which is diluted to 1000 times by water is 90° to 120°; the second ink contains water and a second dye, and the a angle H calculated from the spectral transmittance of the diluted solution which is diluted to 1000 times by water is 0° to 30°; the third ink contains water and a third dye, and a hue angle H calculated from the spectral transmittance of the diluted solution which is diluted to 1000 times by water is 220° to 250°; the fourth ink contains water and 5 mass % or more of a fourth dye with respect to a total 100 mass % of the fourth ink, and the a angle H calculated from the spectral transmittance of the diluted solution which is diluted to 1000 times by water is 50° to 70°, and the pH is 7.0 to 8.0; and the fourth dye contains at least one of C.I. Acid Orange 33 and C.I. Acid Orange 94.

Application Example 7

In the ink jet ink set according to Application Example 6, a dissolved nitrogen amount of the fourth ink may be 6 ppm or less.

Application Example 8

In the ink jet ink set according to Application Example 6 or 7, the ratio of the content of the water to the content of the fourth dye in the fourth ink may be 11.00 to 13.00 by mass.

Application Example 9

In the ink jet ink set according to any one of Application Examples 6 to 8, the fourth dye may contain C.I. Acid Orange 33 and C.I. Acid Orange 94, and the ratio of the content of the C.I. Acid Orange 33 to the content of the C.I. Acid Orange 94 may be 1 to 10 by mass.

Application Example 10

In the ink jet ink set according to any one of Application Examples 6 to 9, the ink jet ink set may further include a fifth ink, in which the fifth ink contains the water and a fifth dye, and a hue angle H calculated from the spectral transmittance of the diluted solution which is diluted to 1000 times by water is 275° to 295°, and the fifth dye contains C.I. Acid Blue 140 and C.I. Acid Violet 48.

Application Example 11

In the ink jet ink set according to Application Example 10, the content of the C.I. Acid Blue 140 may be 6.0 mass % or more with respect to a total 100 mass % of the fifth ink, and the content of the C.I. Acid Violet 48 may be 0.5 mass % to 1.6 mass % with respect to a total 100 mass % of the fifth ink.

Application Example 12

In the ink jet ink set according to any one of Application Examples 6 to 11, the ink jet ink set may be filled in a container containing polyolefin.

Application Example 13

In the ink jet ink set according to Application Example 12, the container may have an ink storage chamber formed of a flexible member.

DESCRIPTION OF EXEMPLARY EMBODIMENTS

Hereinafter, the embodiment of the invention will be described. The following embodiment is only an example for explaining the invention, and the invention is not limited to the embodiment. The invention can be implemented by various forms as long as the forms do not depart from the gist thereof.

1. Ink Jet Ink for Printing

An ink jet ink for printing according to the invention (hereinafter, also simply referred to as "ink") includes water, a predetermined first dye, and a predetermined second dye. Hereinafter, each component used in the present embodiment will be described in detail.

1.1. Dye 1.1.1. First Dye

The ink according to the present embodiment contains C.I. Acid Orange 33 as a first dye. It is possible to obtain a printed matter excellent in color rendering property by simultaneously containing C.I. Acid Orange 33 and a second dye, to be described later.

The content of the first dye with respect to the total content of the ink may be appropriately set, and it is possible to set the content thereof to 0.1 mass % to 10 mass %, for example.

1.1.2. Second Dye

The ink according to the present embodiment contains any one or two kinds selected from C.I. Acid Orange 56 and C.I. Acid Orange 94 as a second dye. It is possible to obtain a printed matter excellent in color rendering property by simultaneously containing the second dye and the first dye described above.

The content of the second dye with respect to the total content of the ink may be appropriately set, and it is possible to set the content thereof to 0.1 mass % to 10 mass %, for example.

The total content of the first dye and the second dye can be set to, for example, 0.2 mass % to 20 mass %, but 5.0 mass % or more is preferable as the printed matter becomes more excellent in the color rendering property.

In addition, the ratio of the content of the first dye to the content of the second dye is preferably in a range of (the former):(the latter)=11:1 to 1:1 by mass, and is more preferably in a range of 6.5:1 to 1.2:1. It is possible to obtain a printed matter excellent in the color rendering property by containing the first dye and the second dye in the above-described preferable range.

In addition, C.I. Acid Orange 94 is preferable as the second dye. In particular, the ratio of the content of C.I. Acid Orange 33 (first dye) to the content of C.I. Acid Orange 94 is more preferably in the range of 6.5:1 to 1.2:1 by mass. Accordingly, it is possible to obtain a printed matter which is more excellent in the color rendering property.

2. Ink Jet Ink Set

An ink jet ink set according to the present embodiment includes at least a first ink, a second ink, a third ink, and a fourth ink. The first ink contains water and a first dye, and a hue angle H calculated from spectral transmittance of a diluted solution which is diluted to 1000 times by water is 90° to 120°; the second ink contains water and a second dye, and the hue angle H calculated from the spectral transmittance of the diluted solution which is diluted to 1000 times by water is 0° to 30°; the third ink contains water and a third dye, and the hue angle H calculated from the spectral transmittance of the diluted solution which is diluted to 1000 times by water is 220° to 250°; the fourth ink contains water and 5 mass % or more of a fourth dye with respect to a total 100 mass % of the fourth ink, and the hue angle H calculated from the spectral transmittance of the diluted solution which is diluted to 1000 times by water is 50° to 70°, and the pH is 7.0 to 8.0; and the fourth dye contains at least one of C.I. Acid Orange 33 and C.I. Acid Orange 94.

As means of obtaining an image excellent in a color developing property and color reproducibility, it is effective to use an orange ink (fourth ink) as a specific color ink in addition to the first ink, the second ink, and the third ink. The ink jet ink set according to the present embodiment includes the fourth ink containing at least one of C.I. Acid Orange 33 and C.I. Acid Orange 94, and therefore, it is possible to obtain a recorded matter excellent in color development. Furthermore, it is possible to allow C.I. Acid Orange 33 and C.I. Acid Orange 94 to be stably present in the fourth ink by controlling the pH of the fourth ink. Accordingly, it is possible to improve the discharge stability by controlling the generation of gas.

2.1. First Ink

The first ink contains water and the first dye, and the hue angle H calculated from spectral transmittance of a diluted solution which is diluted to 1000 times by water is 90° to 120°. The first ink in which the hue angle is within the above-described range is excellent in the ink set as a basic color. In particular, it is possible to make an ink set excellent in color reproducibility by combining the first ink with the second ink and the third ink according to the present embodiment. The excellent color reproducibility means that a gamut volume is improved. In addition, the hue angle H can be measured through a method described in Examples.

The first dye is not particularly limited, but examples thereof include reactive dyes such as C.I. Reactive Yellows 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, and 176; acid dyes such as C.I. Acid Yellows 1, 3, 11, 17, 18, 19, 23, 25, 36, 38, 40, 40:1, 42, 44, 49, 59, 59:1, 61, 65, 67, 72, 73, 79, 99, 104, 159, 169, 176, 184, 193, 200, 204, 207, 215, 219, 219:1, 220, 230, 232, 235, 241, 242, and 246; and disperse dyes such as C.I. Disperse Yellows 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, and 232.

The content of the first dye is preferably 4 mass % to 10 mass % with respect to a total 100 mass % of the first ink. By setting the content of the first dye to be within the above-described range, the color developing property of the obtained recorded matter tends to become more excellent.

2.2. Second Ink

The second ink contains water and the second dye, and the hue angle H calculated from the spectral transmittance of the diluted solution which is diluted to 1000 times by water is 0° to 30°. The second ink in which the hue angle is within the above-described range is excellent in the ink set as a basic color. In particular, it is possible to make an ink set excellent in color reproducibility by combining the second ink with the first ink and the third ink according to the present embodiment. In addition, the hue angle H can be measured through a method described in Examples.

The second dye is not particularly limited, but examples thereof include reactive dyes such as C.I. Reactive Reds 2, 3, 3:1, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 226, 228, and 235; acid dyes such as C.I. Acid Reds 1, 6, 8, 9, 13, 18, 27, 35, 37, 52, 54, 57, 73, 82, 88, 97, 97:1, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, and 415; and disperse dyes such as C.I. Disperse Reds 1, 4, 5, 7, 11, 12, 13, 15, 17, 27, 43, 44, 50, 52, 53, 54, 55, 56, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, and 328.

The content of the second dye is preferably 4 mass % to 10 mass % with respect to a total 100 mass % of the second ink. By setting the content of the second dye to be within the above-described range, the color developing property of the obtained recorded matter tends to become more excellent.

2.3. Third Ink

The third ink contains water and the third dye, and the hue angle H calculated from the spectral transmittance of the diluted solution which is diluted to 1000 times by water is 220° to 250°. The third ink in which the hue angle is within the above-described range is excellent in the ink set as a basic color. In particular, it is possible to make an ink set excellent in color reproducibility by combining the third ink with the first ink and the second ink according to the present embodiment. In addition, the hue angle H can be measured through a method described in Examples.

The third dye is not particularly limited, but examples thereof include C.I. Direct Blues 86, 87, and 199.

The content of the third dye is preferably 5 mass % to 12 mass % with respect to a total 100 mass % of the third ink. By setting the content of the third dye to be within the above-described range, the color developing property of the obtained recorded matter tends to become more excellent.

2.4. Fourth Ink

The fourth ink contains water and 5 mass % or more of the fourth dye with respect to a total 100 mass % of the fourth ink, and the hue angle H calculated from the spectral transmittance of the diluted solution which is diluted to 1000 times by water is 50° to 70°, and the pH is 7.0 to 8.0.

The fourth dye is not particularly limited as long as the fourth dye contains at least one of C.I. Acid Orange 33 and C.I. Acid Orange 94. The fourth dye may contain dyes other than the above-described dyes and examples thereof include reactive dyes such as C.I. Reactive Oranges 1, 4, 5, 7, 11, 12, 13, 15, 16, 20, 30, 35, 56, 64, 67, 69, 70, 72, 74, 82, 84, 86, 87, 91, 92, 93, 95, and 107; acid dyes such as C.I. Acid Oranges 3, 7, 8, 10, 19, 22, 24, 51, 515, 56, 57, 67, 74, 80, 86, 87, 88, 89, 95, 107, 108, 116, 122, 127, 140, 142, 144, 149, 152, 156, 162, 166, and 168; and disperse dyes such as C.I. Disperse Oranges 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, and 142.

Among these, it is preferable that the fourth dye contain both C.I. Acid Orange 33 and C.I. Acid Orange 94. In this case, it is preferable that the ratio of the content of the C.I. Acid Orange 33 to the content of the C.I. Acid Orange 94 be 1 to 8. By setting the ratio of the content of the C.I. Acid Orange 33 to the content of the C.I. Acid Orange 94 to be within the above-described range, the color developing property of the recorded matter tends to become more excellent.

The content of the fourth dye is preferably 5 mass % or more with respect to a total 100 mass % of the fourth ink. By setting the content of the fourth dye to be 5 mass % or more, the color developing property of the obtained image tends to become more excellent. In addition, it is preferable that the upper limit of the content of the fourth dye be 10 mass % or less. Moreover, by setting the content of the fourth dye to be 10 mass % or less, the generation of gas is further suppressed, and the discharge stability tends to become more excellent by allowing the ink to be dissolved even if the gas is generated.

It is preferable that the hue angle H calculated from the spectral transmittance of the diluted solution in which the fourth ink is diluted to 1000 times by water be 50° to 70°. By setting the hue angle H to be within the above-described range, the color developing property of the obtained recorded matter is more excellent and the color reproducibility tends to become more excellent in a case of the ink set. The hue angle H can be measured through the method described in Examples.

The pH of the fourth ink is 7.0 to 8.0 and is preferably 7.2 to 7.5. Gas is barely generated by setting the pH of the fourth ink to be within the above-described range. It is considered that the gas is barely generated in such a range of the pH since it is possible to allow the fourth dye to be stably present in the fourth ink and the fourth dye becomes barely decomposed. The reason for suppressing the generation of gas is not limited thereto. The pH can be controlled by adjusting the concentration of the dye or adjusting the type or the added amount of moisturizing agent, to be described later. The pH can be measured through the method described in Examples.

The dissolved nitrogen amount of the fourth ink is preferably 6 ppm or less. The lower limit of the dissolved nitrogen amount is not particularly limited, but a low dissolved nitrogen amount is preferably as low as possible and is more preferably 0 ppm. By setting the dissolved nitrogen amount of the fourth ink to be within the above-described range, the discharge failure due to the gas (bubble) tends to be suppressed. The reason for this is unknown, but it is considered that the discharge failure can be suppressed by dissolving at least a portion of the generated gas in the ink containing the fourth dye in which gas is easily generated. The dissolved nitrogen amount can be measured through the method described in Examples. In addition, it is possible to adjust the dissolved nitrogen amount in the ink through a deaeration process.

In the fourth ink, the ratio of the content of the water to the content of the fourth dye is preferably 11.00 to 13.00 by mass. The generation of gas tends to be suppressed by setting the ratio of the content of the water to the content of the fourth dye to be within the above-described range.

2.5. Fifth Ink

It is preferable that the ink jet ink set according to the present embodiment further include a fifth ink. The fifth ink is not particularly limited, but examples thereof include water and a fifth dye and the hue angle H calculated from the spectral transmittance of the diluted solution which is diluted to 1000 times by water is 275° to 295°. The color developing property and the color reproducibility tend to be more excellent with the inclusion of the fifth ink.

Examples of the fifth dye is not particularly limited, but examples thereof include reactive dyes such as C.I. Reactive Blues 2, 3, 4, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, and 236, and C.I. Reactive Violets 1, 2, 4, 5, 6, 22, 23, 33, 36, and 38; acid dyes such as C.I. Acid Blues 1, 7, 9, 15, 23, 25, 40, 61:1, 62, 72, 74, 80, 83, 90, 92, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 258, 260, 264, 277:1, 278, 279, 280, 284, 290, 296, 298, 300, 317, 324, 333, 335, 338, 342, and 350, and C.I. Acid Violets 17, 19, 21, 42, 43, 47, 48, 49, 54, 66, 78, 90, 97, 102, 109, and 126; and disperse dyes such as C.I. Disperse Blues 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, and 333, and C.I. Disperse Violets 1, 4, 8, 23, 26, 27, 28, 31, 33, 35, 36, 38, 40, 43, 46, 48, 50, 51, 52, 56, 57, 59, 61, 63, 69, and 77.

Among these, it is preferable that the fifth dye include C.I. Acid Blue 140 and C.I. Acid Violet 48. In this case, the content of the C.I. Acid Blue 140 is preferably 5.0 mass % or more and is more preferably 6.0 mass % to 7.0 mass % with respect to a total 100 mass % of the fifth ink. The color developing property and the color reproducibility tend to become more excellent by setting the content of the C.I. Acid Blue 140 to be within the above-described range. In addition, it is preferable that the content of the C.I. Acid Violet 48 be 0.5 mass % to 1.6 mass % with respect to a total 100 mass % of the fifth ink. The color developing property and the color reproducibility tend to become more excellent by setting the content of the C.I. Acid Violet 48 to be within the above-described range.

The content of the fifth dye is preferably 5.0 mass % to 8.0 mass % with respect to a total 100 mass % of the fifth ink. The color developing property of the recorded matter tends to become more excellent by setting the content of the fifth dye within the above-described range.

It is preferable that the hue angle H calculated from the spectral transmittance of the diluted solution in which the fifth ink is diluted to 1000 times by water be 275° to 295°. By setting the hue angle H to be within the above-described range, the color developing property of the obtained recorded matter tends to become more excellent. The hue angle H can be measured through the method described in Examples.

3. Water

The ink and the ink set according to the present embodiment contain water. It is preferable to use pure water or ultrapure water such as ion-exchanged water, ultra-filtered water, reverse osmosis water, and distilled water. In particular, water obtained through sterilization treatment by irradiation with ultraviolet light, addition of hydrogen peroxide, or the like is preferable as such water prevents generation of mold or bacteria over a long period of time.

The content of water is preferably 50 mass % to 80 mass % and is more preferably 55 mass % to 70 mass % with respect to 100 mass % of inks that can be used in the present embodiment.

4. Urea

The ink that can be used in the present embodiment may further include urea. The discharge stability tends to be more excellent with the inclusion of the urea. The content of the urea is preferably 1 mass % to 10 mass % and more preferably 2 mass % to 8 mass % with respect to 100 mass % of inks that can be used in the present embodiment. The friction fastness of a recording medium when the dyeing density is high tends to be further improved by setting the content of the urea to be 1 mass % or more. In addition, the bleeding tends to be further suppressed by setting the content of the urea to be 10% or less.

5. Moisturizing Agent

The ink that can be used in the present embodiment may further contain a moisturizing agent. The discharge stability from a nozzle of a recording head of a recording device tends to be more enhanced with the inclusion of the moisturizing agent. The moisturizing agent is not particularly limited and compounds used as a moisturizing agent in the general ink can be used. Examples thereof include polyols such as glycerin, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,2-hexanediol, 1,5-pentanediol, 1,6-hexanediol, 1,2,6-hexanetriol, or pentaerythritol, and its ether derivative, its ester derivative, or the like; lactams such as 2-pyrrolidone, N-methyl-2-pyrrolidone, or ε-caprolactam; ureas such as thiourea, ethylene urea, or 1,3-dimethyl-imidazolidinones; and saccharides such as maltitol, sorbitol, gluconolactone, or maltose. The moisturizing agent may be used alone or in a combination of two or more thereof.

The content of the moisturizing agent is preferably 4 mass % to 40 mass % and is more preferably 6 mass % to 15 mass % with respect to 100 mass % of inks that can be used in the present embodiment. The discharge stability tends to be more excellent by setting the content of the moisturizing agent to be within the above-described range.

5. Water-Soluble Organic Solvent

The ink that can be used in the present embodiment may further contain a water-soluble organic solvent which can also function as a penetrating agent. With the inclusion of the water-soluble organic solvent, permeability of the ink that can be used in the present embodiment tends to be further improved due to increased wettability on the recording medium. As such a water-soluble organic solvent, compounds used as a water-soluble organic solvent in the general ink can be used. Examples thereof include lower alcohols such as ethanol or propanol; cellosolves such as ethylene glycol monomethyl ether or ethylene glycol monoethyl ether; carbitols such as diethylene glycol monomethyl ether or diethylene glycol monoethyl ether; glycol ethers such as ethylene glycol monobutyl ether, diethylene glycol monobutyl ether or, triethylene glycol monobutyl ether. The water-soluble organic solvent may be used alone or in a combination of two or more thereof.

It is preferable that the content of the water-soluble organic solvent be 0.5 mass % to 15 mass % with respect to 100 mass % of inks that can be used in the present embodiment. By setting the content of the water-soluble organic solvent to be within the above-described range, the permeability of the ink that can be used in the present embodiment tends to be more excellent due to increased wettability on the recording medium.

6. Surfactant

The ink that can be used in the present embodiment may further contain a surfactant which can also function as a penetrating agent. With the inclusion of the surfactant which can also function as the penetrating agent, the permeability of the ink that can be used in the present embodiment tends to be further improved due to increased wettability on the recording medium. As such a surfactant, compounds used as a surfactant in the general ink can be used. Examples thereof include fatty acid salts; anionic surfactants such as "alkyl sulfuric acid ester salts; nonionic surfactants such as polyoxyethylene alkylphenyl ether; acetylene glycol-based surfactants such as Surfynol 61, 82, 104, 440, 465, and 485 (manufactured by Air Products and Chemicals, Inc.) and Olefin E1010, Olefin PD002W (manufactured by Nissin Chemical Co., Ltd.); cationic surfactants; and amphoteric-ionic surfactants. The surfactant may be used alone or in a combination of two or more thereof.

It is preferable that the content of the surfactant be 0.1 mass % to 5 mass % with respect to 100 mass % of inks that can be used in the present embodiment. By setting the content of the surfactant to be within the above-described range, the permeability of the ink that can be used in the present embodiment tends to be more excellent due to increased wettability on the recording medium.

7. Other Additives

The ink that can be used in the present embodiment may further contain, as necessary, anti-mold agents, preservatives, antioxidants, ultraviolet absorbers, chelating agents, oxygen absorbing agents, pH adjusting agents (for example, triethanolamine, adipic acid, potassium hydroxide), or dissolution auxiliary agents, and other various additives that can be used in the general ink. The various additives may be used alone or in a combination of two or more thereof.

8. Surface Tension

The surface tension of the ink that can be used in the present embodiment is preferably 25 mN/m to 40 mN/m and more preferably 28 mN/m to 35 mN/m. The balance between print quality and reliability such as the discharge stability in a low-temperature region tends to be more excellent by setting the surface tension of the ink that can be used in the present embodiment to be within the above-described range.

The surface tension can be controlled by adjusting the concentration of the dye or adjusting the type or the added amount of moisturizing agent.

9. Viscosity

The viscosity at 20° C. of the ink can be used in the present embodiment is preferably 8.0 mPa·s or less and is more preferably 1.5 mPa·s to 6.0 mPa·s. The balance between the print quality and the reliability such as the discharge stability in a low-temperature region tends to be more excellent by setting the viscosity at 20° C. of the ink that can be used in the present embodiment to be within the above-described range.

The viscosity can be controlled by adjusting the concentration of the dye or adjusting the type or the added amount of moisturizing agent.

10. Container

It is preferable that the ink jet ink set according to the present embodiment be filled in a container (hereinafter, also referred to as "ink storage container") containing polyolefin.

It is preferable that the container have an ink storage chamber formed of a flexible member. Here, in many cases, the ink storage container having the ink storage chamber formed of the flexible member does not have an air inlet in view of sealing properties or costs. For this reason, it is possible to stably supply the ink to the recording device due to deformation of the flexible member according to the remaining amount of ink in the ink storage chamber. The flexible member is not particularly limited. For example, it is possible to use polyolefin such as polyethylene or polypropylene as the flexible member, and it is preferable to use a film-like member.

In a case where gas is generated due to an ink component filled in the ink storage container which has the ink storage chamber formed of the flexible member, there is a concern that expansion of the ink storage container occurs due to the deformation of the flexible member and the ink storage container explodes if the amount of generated gas is large. In the ink that can be used in the present embodiment, the explosion of the ink storage container tends to be suppressed by suppressing the generation of the gas or dissolving the generated gas in the ink.

11. Fabric

Fabric used in the printing method according to the present embodiment may include fiber which is dyeable using the first dye and the second dye. Examples of such fiber include various kinds of fiber materials such as cotton, silk, wool, nylon, polyester, rayon, and acrylic fiber, or may also be mixed spinning, union cloth or nonwoven fabric thereof.

12. Printing Step

In the printing step, it is possible to use various kinds of ink jet systems and it is possible to use both an on-demand system and a continuous system. As an on-demand-type ink jet printer, there is a printer employing a piezoelectric element-recording method which performs recording using a piezoelectric element disposed in a recording head, a printer employing a heat jet recording method that performs recording using heat energy such as a heater of a heating resistor element disposed in the recording head, or the like, and it is possible to employ both in the recording method. In addition, as the recording head, it is possible to use both a serial head system and a line head system.

13. Heating Step

The heating step is performed to fix a dye on fabric on which the printing step is performed. The heating temperature in the heating step is not particularly limited, and may be 100° C. or more. However, the heating temperature may be set to 250° C. or less in consideration of heat-resisting properties of fiber constituting fabric. In addition, the heating time in the heating step is not particularly limited and may be appropriately set according to the type of used fabric or the like.

The heating method that can be applied to the heating step is not particularly limited, and examples thereof include the same method as in the method of dye-fixing treatment in the printing method in the related art such as an ordinary pressure steam method, a high-pressure steam method, or a thermofix method.

15. Other Steps

The printing method according to the present embodiment may include other steps such as a pretreatment step or a washing step, as necessary.

15.1. Pretreatment Step

In the printing method according to the present embodiment, it is preferable to pretreat the fabric using a pretreatment agent prior to the above-described printing step. The pretreatment of the fabric can be performed using means for immersing the fabric in the pretreatment agent, means for coating or spraying the pretreatment agent on the fabric. In addition, it is preferable to dry the fabric to which the pretreatment agent is adhered prior to the above-described printing step.

As the pretreatment agent of the fabric, it is possible to use an aqueous solution containing 0.01 mass % to 20 mass % of a sizing agent such as a water-soluble polymer compound and 1 mass % to 5 mass % of an alkali generating agent. Examples of the sizing agents include starch substances such as corn or wheat; cellulose-based substances such as carboxymethyl cellulose or hydroxymethyl cellulose; polysaccharides such as sodium alginate, gum arabic, locust bean gum, tragacanth gum, guar gum, or tamarind seed; protein such as casein or gelatin; tannin; synthetic water-soluble polymer compounds such as natural water-soluble polymers, such as lignin, polyvinyl alcohol-based compounds, polyethylene oxide-based compounds, acrylic acid-based compounds, or maleic anhydride-based compounds. Examples of the above-described alkali generating agents include sodium hydrogen carbonate, and sodium carbonate. The pretreatment agent can be set to contain various additives such as moisturizing agents, such as urea or thiourea, pH adjusting agents, reduction inhibitors, penetrating agents, sequestering agents, or antiforming agents, as necessary.

The method of supplying the pretreatment agent that can be applied to the pretreatment step is not particularly limited and may be implemented in the usual way. An example thereof includes a padding method. The mangling pressure, the speed, the drying time or the like during the padding may be appropriately set.

15.2. Washing Step

In the printing method according to the present embodiment, it is preferable to perform the washing step after the above-described heating step. It is possible to remove any remaining dye which is not fixed on the fabric through the washing step.

The washing step may be appropriately set in consideration of the type of fabric or various conditions (such as ink deposition amount) during the printing step, and for example, washing with water, washing with hot water, and soaping can be performed.

EXAMPLES

Hereinafter, the invention will be described in detail using Examples, but the scope of the invention is not limited thereto.

16. Examples and Comparative Examples of Ink

16.1. Preparation of Ink Composition

Each of the components are mixed according to the following Table 1 to prepare inks 1 to 9. The unit is mass % in Table 1.

TABLE 1

| | | Example 1 Ink 1 | Example 2 Ink 2 | Example 3 Ink 3 | Example 4 Ink 4 | Example 5 Ink 5 | Example 6 Ink 6 | Comparative Example 1 Ink 7 | Comparative Example 2 Ink 8 | Comparative Example 3 Ink 9 |
|---|---|---|---|---|---|---|---|---|---|---|
| First Dye | AO33 | 5.8 | 4.95 | 4.95 | 5.8 | 5.8 | 5.8 | 5.8 | | |
| Second Dye | AO560 | | | | | | 3.9 | | | 5.2 |
| | AO94 | 0.9 | 0.77 | 0.45 | 2.7 | 4.6 | | | 5.8 | |
| Water, solvent, and other Additives | Ethylene glycol monobutyl ether | 10 | 10 | 10 | 10 | 10 | 10 | 10 | 10 | 10 |
| | Glycerin | 15 | 15 | 15 | 15 | 15 | 15 | 15 | 15 | 15 |
| | Surfynol E1010 | 1 | 1 | 1 | 1 | 1 | 1 | 1 | 1 | 1 |
| | Triethanolamine | 0.5 | 0.5 | 0.5 | 0.5 | 0.5 | 0.5 | 0.5 | 0.5 | 0.5 |
| | Water | 66.8 | 67.78 | 68.1 | 65 | 63.1 | 63.8 | 67.7 | 67.7 | 68.3 |
| Total | | 100 | 100 | 100 | 100 | 100 | 100 | 100 | 100 | 100 |
| Ratio of first dye to second dye (mass ratio) | | 6.4:1 | 6.4:1 | 11:1 | 2.2:1 | 1.3:1 | 1.5:1 | Simplex | Simplex | Simplex |
| Total amount of first dye and second dye (mass %) | | 6.7 | 5.72 | 5.4 | 8.5 | 10.4 | 9.7 | 5.8 | 5.8 | 5.2 |

16.2. Preparation of Fabric

Commonly available silk fabric (12 monme) to which the following pretreatment agent was squeezed at 50% of a pickup rate using a mangle, and was dried for 24 hours at room temperature to obtain fabric.

| | |
|---|---|
| Sodium alginate | 4 parts by mass |
| Guar gum | 4 parts by mass |
| Ammonium sulfate | 4 parts by mass |
| Ultrapure water | 88 parts by mass |
| (Total) | 100 parts by mass |

16.3. Ink Jet Printing

Inks 1 to 9 were installed in a PX-G930 printer (manufactured by Seiko Epson Corp.) to perform printing on the fabric obtained in the above under the condition of Duty 100%. Next, the printed fabric was fixed by steaming for 30 minutes at 100° C., followed by washing for 10 minutes at a temperature of 55° C. using a 0.2% aqueous solution of Olefin E1010 (manufactured by Nissin Chemical Co., Ltd.) and Laccol STA (manufactured by Meisei Chemical Works, Ltd.), and drying the resultant to make a specimen.

Here, "Duty" is a value calculated using the following formula.

Duty (%)=actual number of printed dots/(vertical resolution×horizontal resolution)×100 (in the formula, the "actual number of printed dots" indicates the actual number of dots per unit area, and the "vertical resolution" and the "horizontal resolution" each indicate the resolution per unit area.)

Accordingly, the "Duty" indicates what percentage of the ink dots are disposed among the total 2,073,600 divisions in which a square inch is divided by 1,440 horizontal divisions×1,440 vertical divisions in a case of horizontal 1,440 dpi and vertical 1,440 dpi, for example. That is, the duty of 40% indicates that the ink dots are disposed in 829,440 divisional portions.

16.4. Evaluation of Printed Matter

With respect to the obtained specimen, L*a*b* specified by CIE was obtained by measuring the value at a view angle of 2 degrees and with a D65 light source and a F11 light source using Gretag MacBeth SPM50 manufactured by Gretag Macbeth. Next, ΔL*, Δa*, and Δb* are obtained using the following formulas to obtain ΔE* from each value using the following formulas.

$\Delta L^* = L^*$ in a case of the $F11$ light source $- L^*$ in a case of the $D65$ light source $\Delta a^* = a^*$ in a case of the $F11$ light source $- a^*$ in a case of the $D65$ light source $\Delta b^* = b^*$ in a case of the $F11$ light source $- b^*$ in a case of the $D65$ light source $\Delta E^* = (\Delta L^{*2} + \Delta a^{*2} + \Delta b^{*2})^{1/2}$ With regard to the obtained ΔE*, evaluation on the color rendering property was performed according to the following criteria. The result is shown in Table 2.
<Criteria>
A: ΔE* is less than 5.5
B: ΔE* is greater than or equal to 5.5 and less than 6.0
C: ΔE* is greater than or equal to 6.0 and less than 6.5
D: ΔE* is greater than or equal to 6.5

TABLE 2

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| ΔE | A | B | C | A | B | C | D | D | D |

As obvious from Table 2, it was identified that the color rendering property was suppressed by the ink jet ink for printing according to the invention.

In addition, it was identified that the color rendering property was further suppressed by having a predetermined configuration of the ratio of the content of the first dye to the content of the second dye (by mass) contained in the ink jet ink for printing according to the invention.

In contrast, it was identified that the color rendering property was great in the ink jet ink for printing according to the Comparative Examples.

17. Examples and Comparative Examples of Ink Set Material of Ink

Main materials of the ink used in the following Examples and Comparative Examples are as follows.

Color Materials
  C.I. Acid Orange 33
  C.I. Acid Orange 94
  C.I. Acid Orange 56
  C.I. Acid Yellow 79
  C.I. Acid Red 138
  C.I. Acid Violet 97
  C.I. Direct Blue 87
  C.I. Acid Blue 140
  C.I. Acid Violet 48
Moisturizing Agent
  2-pyrrolidone
  Glycerin
  Triethylene glycol
Water-Soluble Organic Solvent
  Diethylene glycol monobutyl ether
  Triethylene glycol monobutyl ether
Surfactant
  Olefin E1010 (acetylene glycol based surfactant, manufactured by Nissin Chemical Co., Ltd.)
  Olefin PD002W (acetylene glycol based surfactant, manufactured by Nissin Chemical Co., Ltd.)
pH Adjusting Agent
  Triethanolamine
  Adipic acid
  Potassium hydroxide
Urea
  Urea Preparation of Ink Each of the materials was mixed in compositions (mass %) shown in the following table and the mixture was sufficiently stirred to obtain an orange ink (hereinafter, also referred to as "Or-ink"), a yellow ink (hereinafter, also referred to as "Y-ink"), a magenta ink (hereinafter, also referred to as "M-ink"), a cyan ink (hereinafter, also referred to as "C-ink"), and a blue ink (hereinafter, also referred to as "Bu-ink").

Method of Measuring Hue Angle

The hue angle of each ink was obtained as a value when represented by the L*a*b* color system based on the obtained spectral transmittance by measuring the spectral transmittance of the diluted solution in which each ink was diluted to 1000 times by water under the measurement conditions of the D65 light source, the view angle of 2°, and 10 mm of an optical transmission path using a colorimeter Spectrolino (trade name, manufactured by Gretag Macbeth).

Method of Measuring pH

The pH was measured using a glass electrode pH meter.

Method of Measuring Dissolved Nitrogen Amount

The dissolved nitrogen amount of each ink was measured in terms of mass using a gas chromatograph 6890N (trade name, manufactured by Agilent Technologies Inc.).

TABLE 3

|  |  | Or-ink |  |  |  |  |  |  |
|---|---|---|---|---|---|---|---|---|
|  |  | Or-1 | Or-2 | Or-3 | Or-4 | Or-5 | Or-6 | Or-7 |
| Color material | C.I. Acid Orange 33 | 4.95 | 4.95 | 4.95 | 4.95 | 4.95 | 5.8 | 4.95 |
|  | C.I. Acid Orange 94 | 0.75 | 0.75 | 0.75 | 0.75 | 0.75 | — | 0.75 |
|  | C.I. Acid Orange 56 | — | — | — | — | — | 13 | — |
| Moisturizing agent | Glycerin | 12 | 9.5 | 12 | 11 | 9.5 | 9.5 | 8 |
|  | Triethylene glycol | 8 | 6 | 8 | 7 | 6 | 6 | 5.02 |
| Water-soluble organic solvent | Triethylene glycol monobutyl ether | 10 | 7 | 10 | 9 | 7 | 7 | 5.5 |
| Surfactant | Olefin E1010 | 0.6 | 0.6 | 0.6 | 0.6 | 0.6 | 0.6 | 0.6 |
|  | Olefin PD002W | 0.4 | 0.4 | 0.4 | 0.4 | 0.4 | 0.4 | 0.4 |
| pH adjusting agent | Triethanolamine | 0.5 | 0.5 | 0.5 | 0.5 | 0.5 | 0.5 | 0.5 |
|  | Adipic acid | 0.28 | 0.28 | 0.28 | 0.28 | 0.28 | 0.28 | 0.28 |
|  | Potassium hydroxide | — | — | — | — | — | — | — |
|  | Water | 62.52 | 70.02 | 62.52 | 65.52 | 70.02 | 69.92 | 74 |
|  | Total | 100 | 100 | 100 | 100 | 100 | 100 | 100 |
|  | pH | 7.5 | 7.5 | 7.5 | 7.5 | 7.5 | 7.5 | 7.5 |
|  | Dissolved nitrogen amount | 10 | 10 | 6 | 6 | 6 | 6 | 6 |
|  | Amount of water/amount of dye | 10.97 | 12.28 | 10.97 | 11.49 | 12.28 | 12.06 | 12.98 |
|  | Hue angle | 53 | 53 | 53 | 53 | 53 | 52 | 53 |
|  | Color development | A | A | A | A | A | A | A |
|  | Generation of gas | B | A | B | A | A | A | A |
|  | Discharge stability | B | B | A | A | A | A | A |

|  |  | Or-ink |  |  |  |  |  |
|---|---|---|---|---|---|---|---|
|  |  | Or-8 | Or-9 | Or-10 | Or-11 | Or-12 | Or-13 |
| Color material | C.I. Acid Orange 33 | 4.95 | 4.95 | — | 4.95 | 4.95 | 3.5 |
|  | C.I. Acid Orange 94 | 0.75 | 0.75 | — | 0.75 | 0.75 | 0.5 |

TABLE 3-continued

|  |  |  |  |  |  |  |  |
|---|---|---|---|---|---|---|---|
|  | C.I. Acid Orange 56 | — | — | 5.3 | — | — | — |
| Moisturizing agent | Glycerin | 6.5 | 12 | 9.5 | 9.5 | 12 | 12 |
|  | Triethylene glycol | 4.5 | 8 | 6 | 6 | 8 | 8 |
| Water-soluble organic solvent | Triethylene glycol monobutyl ether | 5 | 10 | 7 | 7 | 10 | 10 |
| Surfactant | Olefin E1010 | 0.6 | 0.6 | 0.6 | 0.6 | 0.6 | 0.6 |
|  | Olefin PD002W | 0.4 | 0.4 | 0.4 | 0.4 | 0.4 | 0.4 |
| pH adjusting agent | Triethanolamine | 0.5 | 0.5 | 0.5 | 0.5 | 0.5 | 0.5 |
|  | Adipic acid | 0.28 | 0.24 | 0.28 | 0.28 | — | 0.28 |
|  | Potassium hydroxide | — | — | — | 0.18 | — | — |
|  | Water | 76.52 | 62.56 | 70.42 | 69.84 | 62.8 | 64.22 |
|  | Total | 100 | 100 | 100 | 100 | 100 | 100 |
|  | pH | 7.5 | 8.0 | 7.5 | 10 | 9.0 | 7.5 |
|  | Dissolved nitrogen amount | 6 | 10 | 6 | 12 | 10 | 10 |
|  | Amount of water/amount of dye | 13.42 | 10.98 | 13.29 | 12.25 | 11.02 | 16.06 |
|  | Hue angle | 53 | 53 | 60 | 53 | 53 | 65 |
|  | Color development | A | A | C | A | A | C |
|  | Generation of gas | B | B | A | C | C | A |
|  | Discharge stability | A | B | A | C | B | B |

TABLE 4

|  |  | Y-ink | M-ink | C-ink | Bu-ink | | |
|---|---|---|---|---|---|---|---|
|  |  | Y-1 | M-1 | C-1 | Bu-1 | Bu-2 | Bu-3 |
| Color material | C.I. Acid Yellow 79 | 5 | — | — | — | — | — |
|  | C.I. Acid Red 138 | — | 2.25 | — | — | — | — |
|  | C.I. Acid Violet 97 | — | 1.9 | — | — | — | — |
|  | C.I. Direct Blue 87 | — | — | 7 | — | — | — |
|  | C.I. Acid Blue 140 | — | — | — | 6 | 6 | 6 |
|  | C.I. Acid Violet 48 | — | — | — | 0.9 | 2 | 1.5 |
| Moisturizing agent | 2-pyrrolidone | — | 9.2 | — | 9.3 | 9.3 | 9.3 |
|  | Glycerin | 10 | 11 | 12.5 | 9.5 | 9.5 | 9.5 |
|  | Triethylene glycol | 8 | — | — | — | — | — |
| Water-soluble organic solvent | Diethylene glycol monobutyl ether | — | — | 8 | — | — | — |
|  | Triethylene glycol monobutyl ether | 7.5 | 10 | 7.5 | 7 | 7 | 7 |
| Surfactant | Olefin E1010 | — | — | 1 | — | — | — |
|  | Olefin PD002W | 0.9 | 0.5 | — | 0.9 | 0.9 | 0.9 |
| pH adjusting agent | Triethanolamine | 0.5 | 0.2 | 0.5 | 0.5 | 0.5 | 0.5 |
|  | Urea | — | 5.4 | — | — | — | — |
|  | Water | 68.1 | 59.55 | 63.5 | 65.9 | 64.8 | 65.3 |
|  | Total | 100 | 100 | 100 | 100 | 100 | 100 |
|  | Hue angle | 95 | 350 | 225 | 290 | 305 | 295 |
|  | Color development | A | A | A | A | B | A |
|  | Generation of gas | A | A | A | A | A | A |
|  | Discharge stability | A | A | A | A | A | A |

Examples S1 to S12 and Comparative Examples S1 to S4

Color Developing Property

Solid patterns of the orange ink, the yellow ink, the magenta ink, the cyan ink, and the blue ink prepared as described above were respectively made using PX-G930 (manufactured by Seiko Epson Corp.). As the recording medium, (silk) fabric was used. The color developing property of each color of ink was evaluated by the solid patterns of the orange ink, the yellow ink, the magenta ink, the cyan ink, and the blue ink obtained as described above. The criteria are shown as follows.

Criteria of Yellow Ink: First Ink
  A: The hue angle satisfies 90° to 120° and the OD value (Dy value) is greater than or equal to 1.40.
  B: The hue angle satisfies 90° to 120° and the OD value (Dy value) is greater than or equal to 1.20 and less than 1.40.
  C: The hue angle is not within the range of 90° to 120° or the OD value (Dy value) is less than 1.2.
Criterion of Magenta Ink: Second Ink
  A: The hue angle satisfies 0° to 30° and the OD value (Dm value) is greater than or equal to 1.40.
  B: The hue angle satisfies 0° to 30° and the OD value (Dm value) is greater than or equal to 1.20 and less than 1.40.
  C: The hue angle is not within the range of 0° to 30° or the OD value (Dm value) is less than 1.20.
Criterion of Cyan Ink: Third Ink
  A: The hue angle satisfies 220° to 250° and the OD value (Dc value) is greater than or equal to 1.40.

B: The hue angle satisfies 220° to 250° and the OD value (Dc value) is greater than or equal to 1.20 and less than 1.40.

C: The hue angle is not within the range of 220° to 250° or the OD value (Dc value) is less than 1.20.

Criterion of Orange Ink: Fourth Ink

A: The hue angle satisfies 50° to 70° and the OD value (both of Dm value and Dy value) is greater than or equal to 1.40.

B: The hue angle satisfies 50° to 70° and the OD value (both of Dm value and Dy value) is greater than or equal to 1.20 and less than 1.40.

C: The hue angle is not within the range of 50° to 70° or the OD value (both of Dm value and Dy value) is less than 1.20.

Criterion of Blue Ink: Fifth Ink

A: The hue angle satisfies 275° to 295° and the OD value (both of Dc value and Dm value) is greater than or equal to 1.40.

B: The hue angle satisfies 275° to 295° and the OD value (both of Dc value and Dm value) is greater than or equal to 1.20 and less than 1.40.

C: The hue angle is not within the range of 275° to 295° or the OD value (both of Dc value and Dm value) is less than 1.20.

In addition, the solid patterns using the orange ink, the yellow ink, the magenta ink, the cyan ink, and the blue ink prepared in the above were respectively made using PX-G930 (manufactured by Seiko Epson Corp.). The color developing property as the ink jet ink set was evaluated by the obtained solid patterns. The criteria are shown as follows.

Criterion as Ink Jet Ink Set

A: All the evaluation results of the color developing property of each ink constituting the ink set are A.

B: The evaluation result of the color developing property of each ink constituting the ink set is A or B (there is no C).

C: C is included in one or more cases of the evaluation result of the color developing property of each ink constituting the ink set.

Generation of Gas

Respective ink storage containers which are made of aluminum containing polyolefin and respectively have ink storage chambers formed of a flexible member are filled with the orange ink, the yellow ink, the magenta ink, the cyan ink, and the blue ink prepared in the above. Containers left for 7 days at a temperature of 70° C. and containers left for 9 days at the temperature of 70° C. were prepared. The contents of the containers after being left were checked to evaluate the generation of the gas. The criteria are shown as follows.

Criteria

A: There was no generation of the gas even under the condition of being left for 9 days at the temperature of 70° C.

B: There was generation of the gas under the condition of being left for 9 days at the temperature of 70° C., but there was no generation of the gas under the condition of being left for 7 days at the temperature of 70° C.

C: There was no generation of the gas even under the condition of being left for 7 days at the temperature of 70° C.

The generation of the gas was evaluated as the ink jet ink set. The criteria are shown as follows.

Criteria as Ink Jet Ink Set

A: All the evaluation results of the generation of the gas of each ink constituting the ink set are A.

B: The evaluation result of the generation of the gas of each ink constituting the ink set is A or B (there is no C).

C: C is included in one or more cases of the evaluation result of the generation of the gas of each ink constituting the ink set.

Discharge Stability

Solid patterns of A4 were recorded using the orange ink, the yellow ink, the magenta ink, the cyan ink, and the blue ink prepared in the above through PX-G930 (manufactured by Seiko Epson Corp.). As the recording media, plain papers were used. After recording 2000 sheets of paper, the presence or absence of nozzle omission or the generation of curved flying of ink droplets was visually checked to evaluate the discharge stability of each ink. The criteria are shown as follows.

A: After recording 2000 sheets of paper, the nozzle omission or the curved flying of the ink droplets was generated in 2 nozzles or less.

B: After recording 2000 sheets of paper, the nozzle omission or the curved flying of the ink droplets was generated in 3 nozzles to 5 nozzles.

C: After recording 2000 sheets of paper, the nozzle omission or the curved flying of the ink droplets was generated in 6 nozzles or more.

The discharge stability as the ink jet ink set was evaluated. The criteria are shown as follows.

Criteria as Ink Jet Ink Set

A: All the evaluation results of the discharge stability of each ink constituting the ink set are A.

B: The evaluation result of the discharge stability of each ink constituting the ink set is A or B (there is no C).

C: C is included in one or more cases of the evaluation result of the discharge stability of each ink constituting the ink set.

TABLE 5

| | | Classification of ink set | | | | | Evaluation result | | | | | |
| | | | | | | | | Determination of each color | | | | Determination |
| | Ink set | Y-ink | M-ink | C-ink | Or-ink | Bu-ink | Items | Y-ink | M-ink | C-ink | Or-ink | Bu-ink | as ink set |
|---|---|---|---|---|---|---|---|---|---|---|---|---|---|
| Example S1 | Set 1 | Y-1 | M-1 | C-1 | Or-1 | — | Color development | A | A | A | A | — | A |
| | | | | | | | Generation of gas | A | A | A | B | — | B |
| | | | | | | | Discharge stability | A | A | A | B | — | B |
| Example S2 | Set 2 | Y-1 | M-1 | C-1 | Or-2 | — | Color development | A | A | A | A | — | A |
| | | | | | | | Generation of gas | A | A | A | A | — | A |
| | | | | | | | Discharge stability | A | A | A | B | — | B |
| Example S3 | Set 3 | Y-1 | M-1 | C-1 | Or-3 | — | Color development | A | A | A | A | — | A |
| | | | | | | | Generation of gas | A | A | A | B | — | B |
| | | | | | | | Discharge stability | A | A | A | A | — | A |

TABLE 5-continued

| | Classification of ink set | | | | | | Evaluation result | | | | | Determination |
| --- | --- | --- | --- | --- | --- | --- | --- | --- | --- | --- | --- | --- |
| | | | | | | | Determination of each color | | | | | |
| | Ink set | Y-ink | M-ink | C-ink | Or-ink | Bu-ink | Items | Y-ink | M-ink | C-ink | Or-ink | Bu-ink | as ink set |
| Example S4 | Set 4 | Y-1 | M-1 | C-1 | Or-4 | — | Color development | A | A | A | A | — | A |
| | | | | | | | Generation of gas | A | A | A | A | — | A |
| | | | | | | | Discharge stability | A | A | A | A | — | A |
| Example S5 | Set 5 | Y-1 | M-1 | C-1 | Or-5 | — | Color development | A | A | A | A | — | A |
| | | | | | | | Generation of gas | A | A | A | A | — | A |
| | | | | | | | Discharge stability | A | A | A | A | — | A |
| Example S6 | Set 6 | Y-1 | M-1 | C-1 | Or-6 | — | Color development | A | A | A | A | — | A |
| | | | | | | | Generation of gas | A | A | A | A | — | A |
| | | | | | | | Discharge stability | A | A | A | A | — | A |
| Example S7 | Set 7 | Y-1 | M-1 | C-1 | Or-7 | — | Color development | A | A | A | A | — | A |
| | | | | | | | Generation of gas | A | A | A | A | — | A |
| | | | | | | | Discharge stability | A | A | A | A | — | A |
| Example S8 | Set 8 | Y-1 | M-1 | C-1 | Or-8 | — | Color development | A | A | A | A | — | A |
| | | | | | | | Generation of gas | A | A | A | B | — | B |
| | | | | | | | Discharge stability | A | A | A | A | — | B |
| Example S9 | Set 9 | Y-1 | M-1 | C-1 | Or-9 | — | Color development | A | A | A | A | — | A |
| | | | | | | | Generation of gas | A | A | A | B | — | B |
| | | | | | | | Discharge stability | A | A | A | B | — | B |
| Example S10 | Set 10 | Y-1 | M-1 | C-1 | Or-5 | Bu-1 | Color development | A | A | A | A | A | A |
| | | | | | | | Generation of gas | A | A | A | A | A | A |
| | | | | | | | Discharge stability | A | A | A | A | A | A |
| Example S11 | Set 11 | Y-1 | M-1 | C-1 | Or-5 | Bu-2 | Color development | A | A | A | A | B | B |
| | | | | | | | Generation of gas | A | A | A | A | A | A |
| | | | | | | | Discharge stability | A | A | A | A | A | A |
| Example S12 | Set 12 | Y-1 | M-1 | C-1 | Or-5 | Bu-3 | Color development | A | A | A | A | A | A |
| | | | | | | | Generation of gas | A | A | A | A | A | A |
| | | | | | | | Discharge stability | A | A | A | A | A | A |
| Comparative Example S1 | Set 13 | Y-1 | M-1 | C-1 | Or-10 | — | Color development | A | A | A | C | — | C |
| | | | | | | | Generation of gas | A | A | A | A | — | A |
| | | | | | | | Discharge stability | A | A | A | A | — | A |
| Comparative Example S2 | Set 14 | Y-1 | M-1 | C-1 | Or-11 | — | Color development | A | A | A | A | — | A |
| | | | | | | | Generation of gas | A | A | A | C | — | C |
| | | | | | | | Discharge stability | A | A | A | C | — | C |
| Comparative Example S3 | Set 15 | Y-1 | M-1 | C-1 | Or-12 | — | Color development | A | A | A | A | — | C |
| | | | | | | | Generation of gas | A | A | A | C | — | A |
| | | | | | | | Discharge stability | A | A | A | B | — | A |
| Comparative Example S4 | Set 16 | Y-1 | M-1 | C-1 | Or-13 | — | Color development | A | A | A | C | — | A |
| | | | | | | | Generation of gas | A | A | A | A | — | C |
| | | | | | | | Discharge stability | A | A | A | B | — | C |

By comparison between Examples S1, S3, and S9 and other Examples, it was found that it is easier to suppress the generation of the gas if the ratio of the content of the water to the content of the fourth dye is 11.00 to 13.00. In addition, by comparison between Examples S1, S2, and S9 and other Examples, it was found that the discharge stability is more excellent if the dissolved nitrogen amount of the fourth dye is 6 ppm or less. Needless to say, the ink sets of Examples S10 to S12 including the fifth ink in addition to the first ink to the fourth ink are excellent in the color reproducibility compared to the ink sets of Examples S1 to S9 including the first ink to fourth ink.

In addition, by comparison between Comparative Example S1 and Examples, it was found that the color developing property deteriorates if at least one of C.I. Acid Orange 33 and C.I. Acid Orange 94 is not included. Furthermore, by comparison between Comparative Examples S2 and S3 and Examples, it was found that the discharge stability deteriorates due to the generation of a large amount of gas if the pH is higher than 8. In addition, by comparison between Comparative Example S4 and Examples, it was found that the color developing property deteriorates if the content of the fourth dye is less than 5 mass %.

The invention is not limited to the above-described embodiment and various deformation can be made.

For example, the invention includes substantially the same configuration as that described in the embodiment (for example, a configuration where the function, method, and result are the same as those of the embodiment or a configuration where the purpose and the effect are the same as those of the embodiment).

The invention includes a configuration where an inessential part of the configuration described in the embodiment is replaced.

The invention includes a configuration that exhibits the same effect as that described in the embodiment or a configuration that can achieve the same purpose as that of the embodiment.

In addition, the invention includes a configuration where a well-known technology is added to the configuration described in the embodiment.

The entire disclosure of Japanese Patent Application No. 2013-132385 and No. 2013-132382, filed Jun. 25, 2013 are expressly incorporated by reference herein.

What is claimed is:
1. An ink jet ink for printing, comprising:
water;
a first dye; and
a second dye,
wherein the first dye is C.I. Acid Orange 33, and
wherein the second dye is one or two kinds selected from C.I. Acid Orange 56 and C.I. Acid Orange 94.

2. The ink jet ink for printing according to claim 1, wherein the ratio of the content of the first dye to the content of the second dye is in a range of (the former): (the latter)=11:1 to 1:1 by mass.

3. The ink jet ink for printing according to claim 1, wherein the ratio of the content of the first dye to the content of the second dye is in a range of (the former): (the latter)=6.5:1 to 1.2:1 by mass.

4. The ink jet ink for printing according to claim 1, wherein the total content of the first dye and the second dye is 5.0 mass % or more.

5. A printing method comprising:
applying the ink jet ink for printing according to claim 1 to fabric for printing; and
heating the fabric to fix a dye.

6. An ink jet ink set comprising at least:
a first ink;
a second ink;
a third ink; and
a fourth ink,
wherein the first ink contains water and a first dye, and a hue angle H calculated from spectral transmittance of a diluted solution which is diluted to 1000 times by water is 90° to 120°,
wherein the second ink contains water and a second dye, and a hue angle H calculated from the spectral transmittance of the diluted solution which is diluted to 1000 times by water is 0° to 30°,
wherein the third ink contains water and a third dye, and a hue angle H calculated from the spectral transmittance of the diluted solution which is diluted to 1000 times by water is 220° to 250°,
wherein the fourth ink contains water and 5 mass % or more of a fourth dye with respect to a total 100 mass % of the fourth ink, and a hue angle H calculated from the spectral transmittance of the diluted solution which is diluted to 1000 times by water is 50° to 70°, and the pH is 7.0 to 8.0, and
wherein the fourth dye contains at least one of C.I. Acid Orange 33 and C.I. Acid Orange 94.

7. The ink jet ink set according to claim 6, wherein a dissolved nitrogen amount of the fourth ink is 6 ppm or less.

8. The ink jet ink set according to claim 6, wherein the ratio of the content of the water to the content of the fourth dye in the fourth ink is 11.00 to 13.00 by mass.

9. The ink jet ink set according to claim 6, wherein the fourth dye contains C.I. Acid Orange 33 and C.I. Acid Orange 94, and
wherein the ratio of the content of the C.I. Acid Orange 33 to the content of the C.I. Acid Orange 94 is 1 to 10 by mass.

10. The ink jet ink set according to claim 6, further comprising:
a fifth ink,
wherein the fifth ink contains the water and a fifth dye, and a hue angle H calculated from the spectral transmittance of the diluted solution which is diluted to 1000 times by water is 275° to 295°, and
wherein the fifth dye contains C.I. Acid Blue 140 and C.I. Acid Violet 48.

11. The ink jet ink set according to claim 6, wherein the content of the C.I. Acid Blue 140 is 6.0 mass % or more with respect to a total 100 mass % of the fifth ink, and
wherein the content of the C.I. Acid Violet 48 is 0.5 mass % to 1.6 mass % with respect to a total 100 mass % of the fifth ink.

12. The ink jet ink set according to claim 6, wherein the ink jet ink set is filled in a container containing polyolefin.

13. The ink jet ink set according to claim 6, wherein the container has an ink storage chamber formed of a flexible member.

* * * * *